No. 670,984. Patented Apr. 2, 1901.
C. S. CROSSLEY.
CORN PLANTER.
(Application filed Aug. 21, 1899.)
(No Model.)
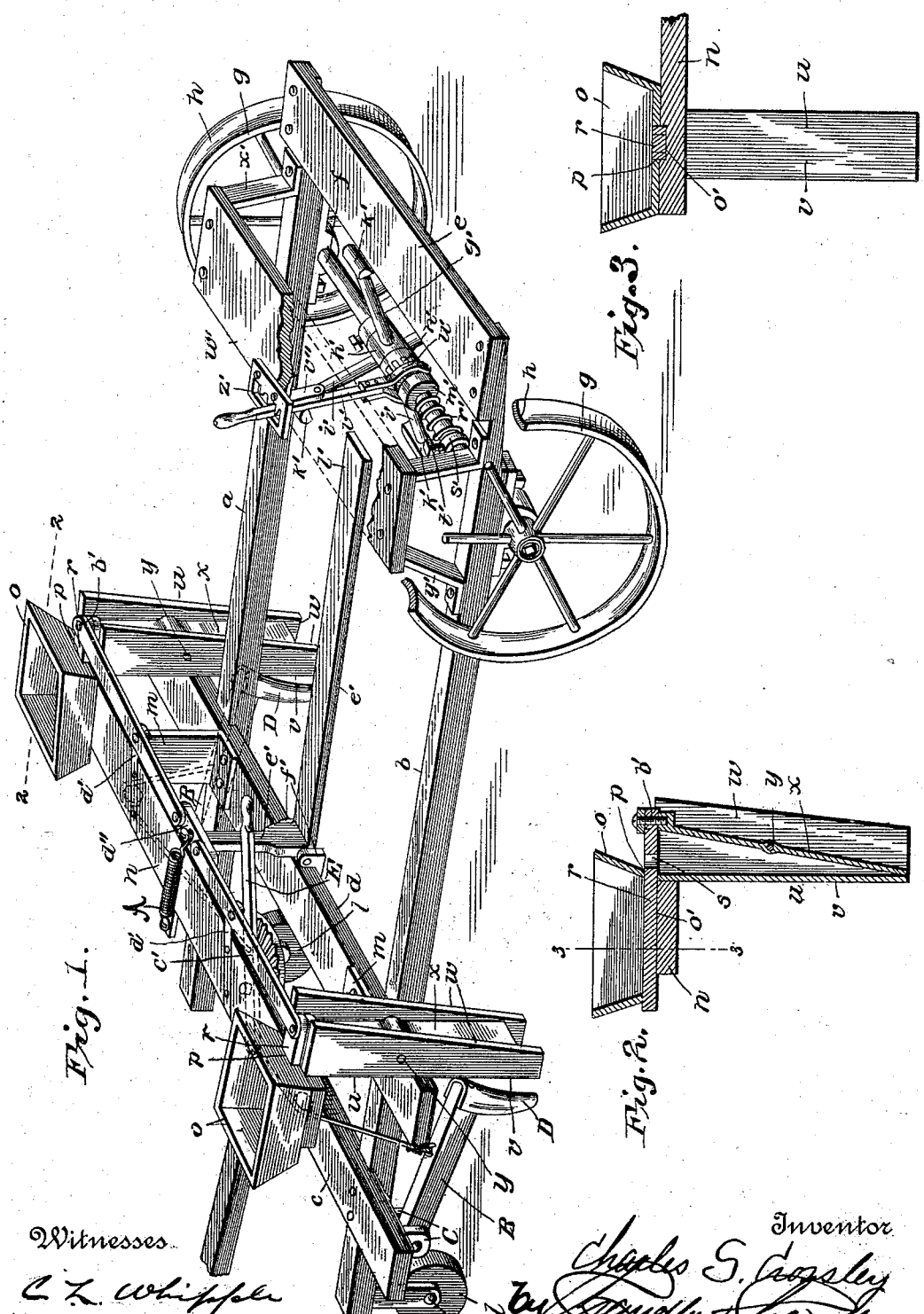

UNITED STATES PATENT OFFICE.

CHARLES S. CROSSLEY, OF NEWARK, OHIO.

CORN-PLANTER.

SPECIFICATION forming part of Letters Patent No. 670,984, dated April 2, 1901.

Application filed August 21, 1899. Serial No. 728,042. (No model.)

*To all whom it may concern:*

Be it known that I, CHARLES S. CROSSLEY, a citizen of the United States, residing at Newark, in the county of Licking, State of Ohio, have invented certain new and useful Improvements in Corn-Planters; and I do hereby declare the following to be a full, clear, and exact description of the invention, such as will enable others skilled in the art to which it appertains to make and use the same.

This invention relates to corn-planters; and it has for one object to provide a construction which may be operated to plant corn at regular intervals automatically and in which the location of each line of planting will be indicated by a mark made in the earth.

A further object of the invention is to combine with a mechanism of this nature adjustable means for making a furrow to receive the seed-corn and means for throwing the dropping mechanism into and out of operative engagement with the supporting-wheels of the apparatus.

In the drawings forming a portion of this specification, and in which like letters of reference indicate similar parts in the several views, Figure 1 is a perspective view, partly broken away, showing a planter constructed in accordance with my invention. Fig. 2 is a section on line 2 2 of Fig. 1. Fig. 3 is a section on line 3 3 of Fig. 2.

Axles $i$ are attached to the under sides of the rails $a$ and $b$, adjacent to their forward ends, upon each of which is journaled a supporting-wheel $l$, as shown, adapted to turn independently of said axle. Supported above the second cross-piece $d$ upon angle-irons $m$ or in any other suitable manner is a support $n$, extending beyond the rails $a$ and $b$ and having arranged upon its upper surface and adjacent each end thereof a hopper $o$. In the slot $p$ is slidably arranged a plate or slide $r$, the ends of which project beyond the adjacent sides of the hopper at all times to prevent displacement of the plate. This plate $r$ has a vertical perforation $s$ therein, so located that when the slide is at the inner limit of motion the perforations will lie within the hopper to receive a number of seeds proportionate to its size, and when it is at the limit of its outward movement the perforation will be outside of the hopper and will drop its seeds over the edge of the support $n$. A vertical chute $u$ is formed adjacent each hopper $o$ in such position as to receive the discharge from the perforations in the slides or when the slides are withdrawn to a sufficient extent. Each chute comprises a front piece $v$, to which the side pieces $w$ are attached, the back being open.

In order that the seeds may be dropped at the proper time, I have pivotally mounted in each chute a plate $x$, having trunnions $y$ extending upon a common axis and journaled in bearings in the sides of the chute. Upon the outer face of each of the plates $x$ is a lug, which is provided with a vertical threaded perforation to receive a screw $b'$, which is passed through a slot in the plate $r$. The screws $b'$ also form a means of attachment of levers $c'$ pivotally to ears $d'$, carried by the support $n$, the opposite ends of said levers extending inwardly along the support and being pivotally connected with the laterally-extending cross-head $d''$ of an angular lever $e'$, which is pivoted at its angle to ears $f'$, carried by the cross-piece $d$ and whose foot extends rearwardly of the frame of the machine and into the path of a knocker carried by the rear axle $f$ of the machine. This knocker $g'$ consists of a hub $h'$, loosely mounted upon the axle $f$ and provided with radial spokes $i'$, having laterally-extending heads $k'$, adapted to make immediate engagement with the foot $l'$ of the lever $e'$, the lengths of said spokes being such that their heads will engage the earth as they rotate and make marks in the form of depressions therein.

In order to detachably connect the hub of the knocker with the axle $f$, I connect with said axle, by means of a spline or in any other desirable manner, a slidable body $m'$, having a serrated end $n'$, whose projections are adapted to enter corresponding serrations in the adjacent end of the hub of the knocker. A helical spring $r'$, surrounding the axle $f$, bears at one end against the body $m'$ and at the other upon a collar $s'$, adjustably connected with the axle by means of a set-screw $t'$ and tends to force the projections of the body $m'$ into engagement with the hub of the knocker. In order to disengage the body $m'$ from the hub of the knocker, I form a peripheral groove in the latter, and in this groove I arrange the legs of a spanner $u'$, having an upwardly-extending operating-handle $v'$, pivotally connected with a hanger $v''$, depending from the cross-piece $w'$, supported upon irons $x'$ and $y'$, fixed to the rails $a$ and $b$. Carried by the cross-piece $w'$ is also a notched plate $z'$, whose notches are formed at one edge of a longitudinal slot therein, through which slot the handle $v'$ is passed and with which notches it is adapted to engage. Thus by manipulation of the handle $v'$ the striker may be disconnected from operative engagement with the axle $f$, and when said handle is released such engagement will be effected by means of the spring $r'$. Thus, the knocker being in operative engagement with its axle, the radial spokes will successively engage the foot of the lever $e'$, causing it to operate to draw the adjacent ends of the lever $c'$ outwardly and force the plates $r$ into the hoppers to receive the seed-corn in their perforations. This engagement of the spoke-heads with the lever $e'$ is in a downward direction, and the initial engagement with lever $e'$ is at such a point as to make its depression gradual. When, however, the spokes have passed from the lever, the helical spring A, attached at one end to lever $e'$ and at the other end to the support $n$, will draw the head of the lever $e'$ backwardly to project the perforations in plates $r$ beyond the hoppers and over the chutes, depositing the seeds into their respective chutes and into the pockets formed by plates $x$ and the adjacent portions of the chutes. As the next knocker-spoke engages the lever $e'$ the plates $x$ are operated to release the corn and it is dropped from the chutes.

In order to form a furrow for each chute, I pivotally connect drag-bars B to depending ears C on the under sides of the front cross-pieces $c$, which drag-bars are adapted to extend in alinement with their respective chutes and each of which has a downwardly-extending furrow-opener secured to its rearwardly-extending free end. These furrow-openers D are semicircular in cross-section at their upper ends and taper downwardly to points, as shown, their rear surfaces being curved slightly backwardly in vertical planes and their front surfaces being concaved, as shown.

In order to regulate the depths of the furrows, I attach a cord or chain to each drag-bar B, which latter are passed upwardly and over pulleys or other forms of guides on the under side of support $n$ and are engaged with lever E on opposite sides of its pivotal connection with the under side of support $n$. The lever E has an operating-handle, as shown, for its manipulation and may be held in its adjusted position in any desired manner. Thus by manipulation of the lever E the connection with the furrow-forming drag-bars may be manipulated to raise or lower the furrow-openers D to vary the depths of the furrows formed.

It will be readily understood that I may vary the specific construction and arrangement shown and that any suitable materials and proportions may be used without departing from the spirit of the invention.

Having thus described my invention, what I claim is—

1. A planter comprising a rectangular frame having side rails and connecting end rails, a wheel mounted at the forward end of each side rail, an axle mounted transversely of the frame near the rear ends thereof, wheels keyed to the ends of the axle to cause it to revolve when the planter is drawn, a support mounted above the frame and transversely thereof, a hopper mounted upon each end of the support, slots in the bottoms of the hoppers, plates slidably arranged in the slots and having vertical perforations, levers pivoted to the support at their centers, each lever having its outer end pivoted to a plate, an angle-lever pivoted at the center of the frame and having its upper end pivotally connected to the inner ends of the first-named levers, a spring for holding the angle-lever at its upward limit of motion, drag-bars pivoted to the forward cross-pieces having downwardly-projecting furrow-openers, a lever mounted upon the support at the forward end of the frame, cords connected to the lever and to the drag-bars to permit of their being raised and lowered, a knocker mounted to rotate on the axle at the rear of the frame and adapted to engage the angle-lever when rotated, means for causing the knocker to rotate with the axle, and vertical chutes mounted in the rear of the hoppers.

2. A planter comprising a rectangular frame having side rails and connecting end rails, a wheel mounted at the forward end of each side rail, an axle mounted transversely of the frame near the ends thereof, wheels keyed to the ends of the axle to cause it to revolve when the planter is drawn, a support mounted above the frame and transversely thereof, a hopper mounted upon each end of the support, slots in the bottoms of the hoppers, plates slidably arranged in the slots and having vertical perforations, vertical chutes mounted in the rear of the hoppers, plates pivoted in the chutes and having trunnions mounted in bearings in the sides of the chutes, the upper ends of the plates being connected to the adjacent ends of the slidable plates, levers pivoted to the support at their centers, each lever having its outer end pivoted to a plate, an angle-lever pivoted at the center of the frame and having its upper end pivotally connected to the inner ends of the first-named levers, a spring for holding the angle-lever at its upward limit of motion, drag-bars pivoted to the forward cross-pieces having downwardly-projecting furrow-openers, a lever mounted upon the support at the forward end of the frame, cords connected to the lever and to the drag-bars to permit of their being raised and lowered, a knocker mounted to rotate on the axle at the rear of the frame and adapted to engage the angle-lever when rotated, teeth formed upon one side of the knocker, a sleeve slidably arranged upon the axle, means for causing the sleeve to rotate with the axle, a groove encircling the sleeve, teeth upon one end of the sleeve, a lever pivoted upon the frame and having fingers resting in the groove whereby the sleeve may be operated to cause its teeth to engage those of the knocker.

In testimony whereof I affix my signature in presence of two witnesses.

CHARLES S. CROSSLEY.

Witnesses:
D. A. REDMAN,
D. E. RAISON.